Feb. 6, 1934.  O. D. DU BOIS  1,946,133
TESTING APPARATUS
Filed April 16, 1928   4 Sheets-Sheet 1
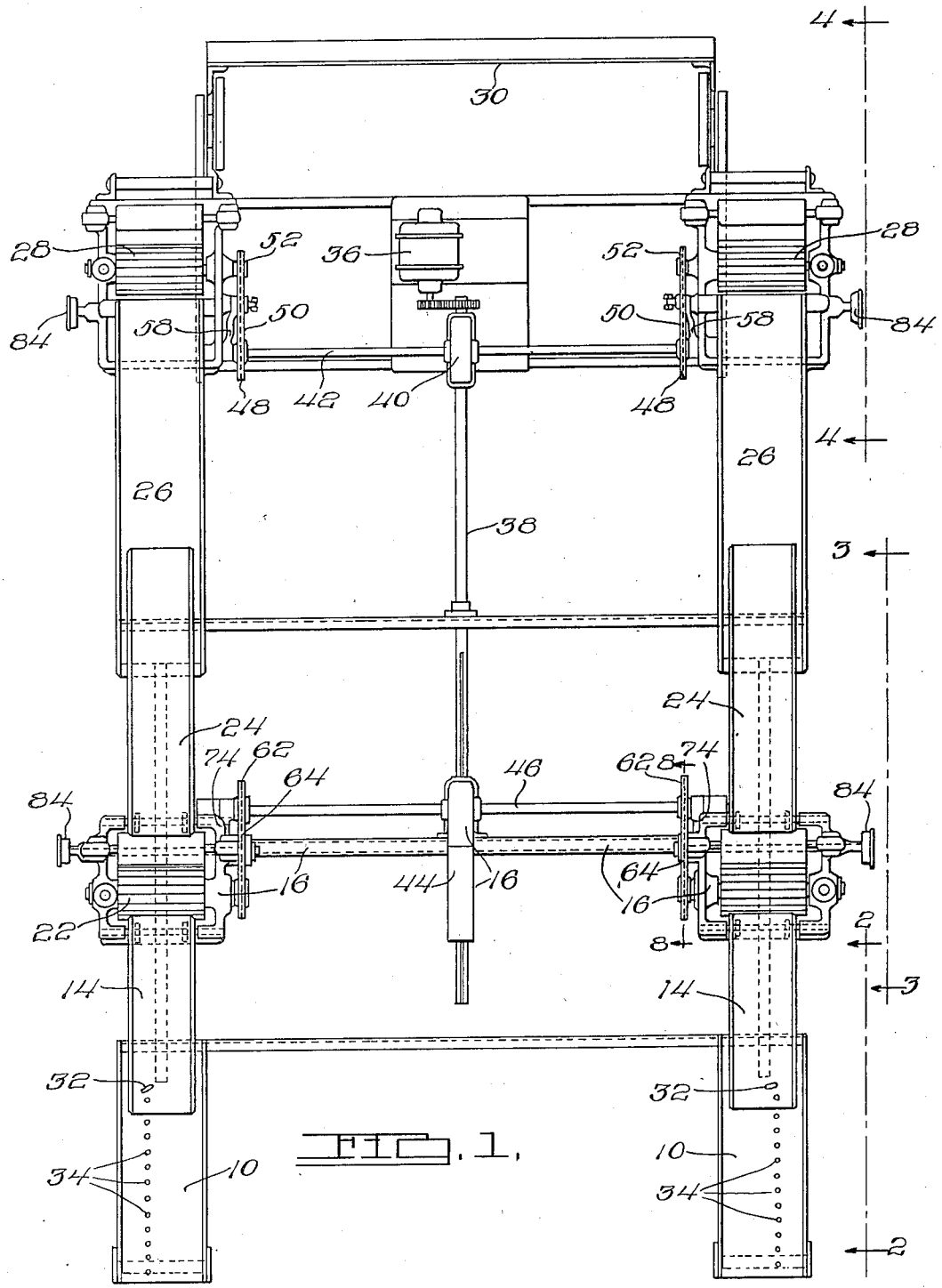
INVENTOR
Otto D. DuBois
BY
In. W. McConkey
ATTORNEY Feb. 6, 1934.     O. D. DU BOIS     1,946,133
TESTING APPARATUS
Filed April 16, 1928     4 Sheets-Sheet 2
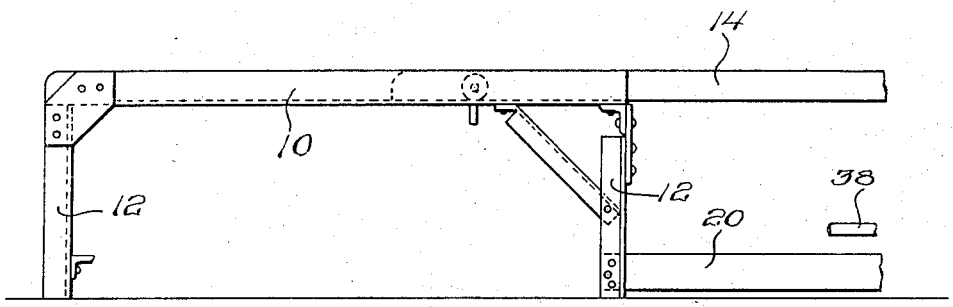
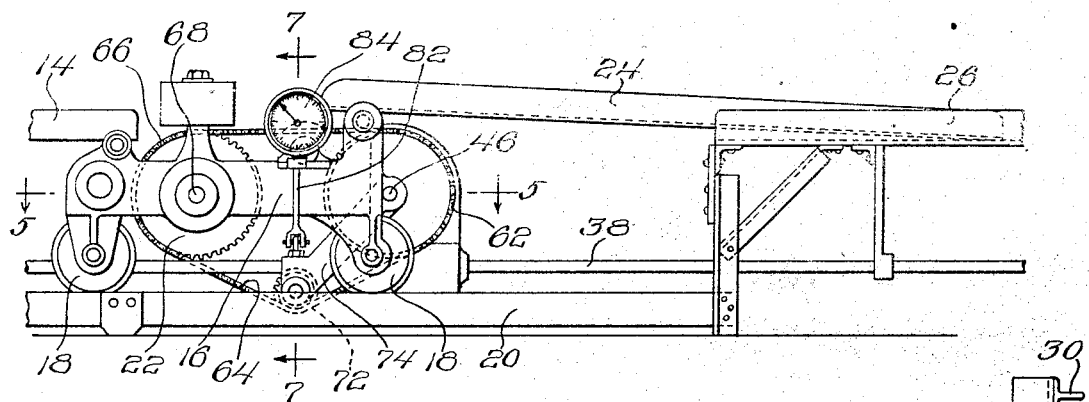
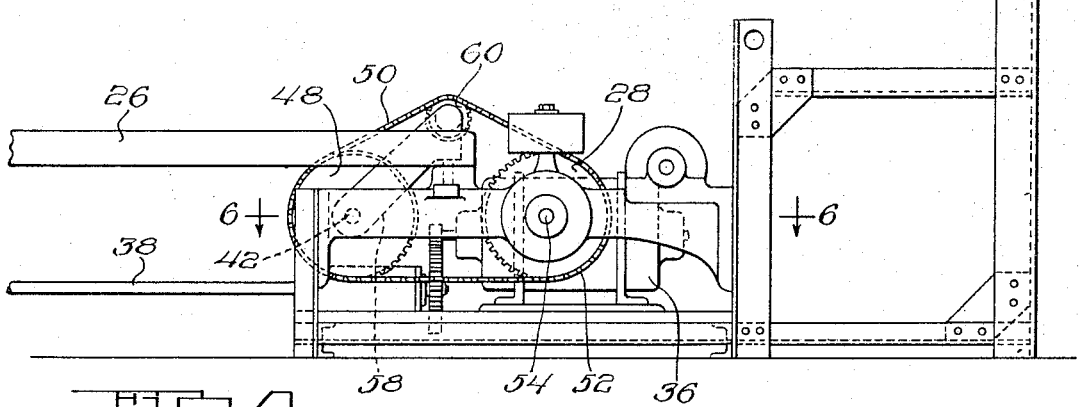
INVENTOR
Otto D. Du Bois
BY
M. W. McConkey
ATTORNEY

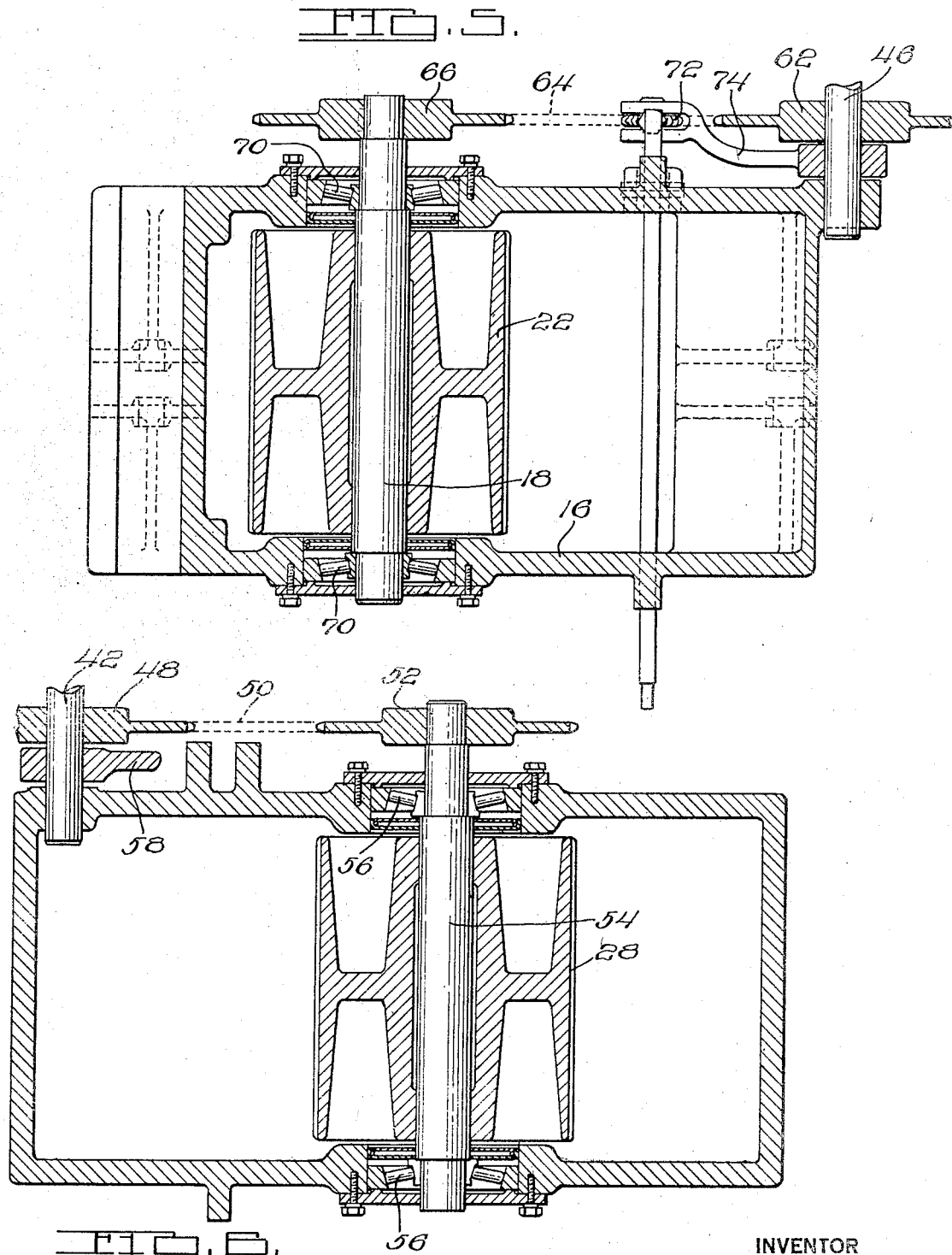

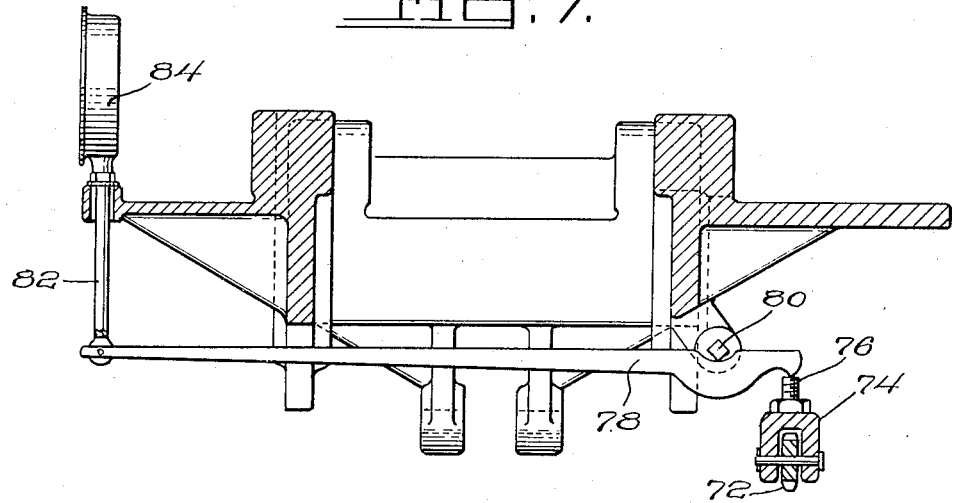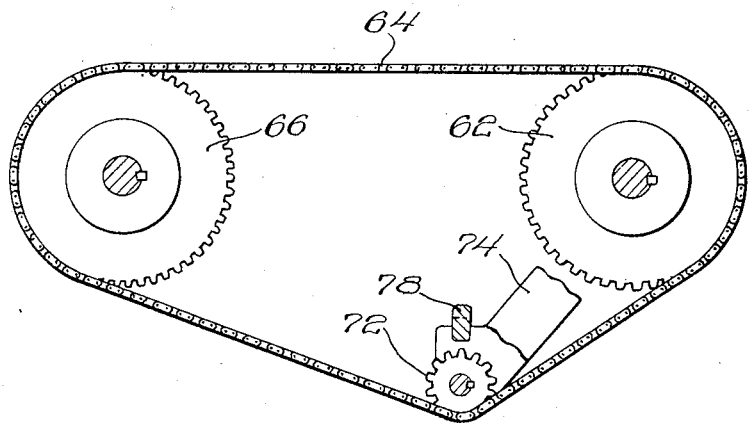

Patented Feb. 6, 1934

1,946,133

UNITED STATES PATENT OFFICE 1,946,133

TESTING APPARATUS

Otto Darrel Du Bois, South Bend, Ind., assignor, by mesne assignments, to Bendix-Cowdrey Brake Tester, Inc., New York, N. Y., a corporation of Delaware Application April 16, 1928. Serial No. 270,192

10 Claims. (Cl. 265—25)

This invention relates to the testing of brakes for automobiles or the like, and is illustrated as embodied in mechanism for testing a set of four-wheel automobile brakes.

In one desirable and simplified arrangement, the wheel is turned against the resistance of its brake by a flexible tension element such as a sprocket chain, and the brake resistance is shown on an indicator operated by the driving tension on this element. For example, the chain or its equivalent may run over an idler sprocket, shown mounted on a pivoted lever or arm, which is thus shifted by tension on the chain and which may operate through means such as a multiplying lever to control an indicator.

Another feature of the invention relates to the connection of a motor or other source of power, which preferably operates the testing devices for all four wheels, for operating movable testing apparatus which is shown as mounted on a carriage supporting the rear driving wheels. From a somewhat different point of view, and without necessarily being limited to the above-described constructions, the invention contemplates a novel and simple adjustment for wheel-base, preferably by shifting the carriage automatically by the traction of the driving wheels.

The above and other objects and features of the invention, including various novel and desirable details of construction and arrangement, will be apparent from the following description of one illustrative embodiment shown in the accompanying drawings, in which:

Figure 1 is a top plan view of the entire apparatus;

Figure 2 is a side elevation of the rear end of the apparatus, looking in the direction of the arrows 2—2 of Figure 1;

Figure 3 is a side elevation of the central portion of the apparatus, looking in the direction of the arrows 3—3 of Figure 1;

Figure 4 is a side elevation of the front end of the apparatus, looking in the direction of the arrows 4—4 of Figure 1;

Figure 5 is a horizontal section through part of the movable carriage, on the line 5—5 of Figure 3;

Figure 6 is a similar horizontal section through the apparatus for testing the front brakes, on the line 6—6 of Figure 4;

Figure 7 is a section through one of the testing mechanisms on the carriage, on the line 7—7 of Figure 3; and Figure 8 is a section on the line 8—8 of Figure 1, showing one of the drive chains and its sprockets.

The illustrated apparatus is intended to be set in a pit, or to be provided with a suitable inclined ramp up which a car may be driven. In either case the car is driven into stationary ways or tracks 10 supported on legs 12, and thence into movable ways 14 secured to and moving with a carriage 16 having wheels or rollers 18 running on tracks 20 on opposite sides of the apparatus.

As the front wheels run off ways 14, they engage rubber-covered or grooved steel rollers 22 rotatably mounted on the carriage 16, and push the carriage as far forward as it will go, after which the front wheels pass over the rollers 22, across ways 24 mounted on the carriage 16, over stationary ways 26, and on to rollers 28 forming parts of the mechanism for testing the front brakes. Rollers 22 and 28 are preferably interchangeable. When the front wheels of the car are on rollers 28, the car is secured in any desired manner to a cross member 30 of the frame.

When the carriage is in the forward position to which the front wheels shift it, the machine is set for a car having the shortest wheel-base which the machine can accommodate, and such a car would then have its rear wheels on rollers 22 at the time the front wheels are on rollers 28. A car of longer wheel-base would at this time have its rear driving wheels on the movable ways 14, and continued rotation of the driving wheels after the front wheels are held by fastening the car to member 30 will draw the carriage frictionally to the rear again until rollers 22 are under the rear driving wheels. The carriage may be held in this position by pins 32 dropped through alined openings 34 in ways 14 and 10.

The four wheel brake-testing devices are preferably all driven from a single source of power such as an electric motor 36 acting through reduction gearing to turn a main drive shaft 38. Shaft 38 operates through worm gearing in a casing 40 to turn a front transverse drive shaft 42 which operates the two front brake-testing devices. The shaft 38 is splined to the worm of a set of worm gears in a casing 44 of the carriage 16, which worm gears drive a rear transverse drive shaft 46 mounted on the carriage. Thus the drive to shaft 46 is extensible to compensate for the different positions of the carriage for cars of different wheel-base.

Each end of shaft 42 is provided with means such as a sprocket 48 for driving a sprocket chain 50, or an equivalent flexible tension element, which in turn drives a sprocket 52 rigid with a shaft 54 mounted in anti-friction bearings 56 and carrying the corresponding roller 28. An arm or lever 58, loosely sleeved on the end of shaft 42, carries an idler sprocket 60 engaging the chain 50 and holding it tight. As more fully explained below, each lever 58 engages one end of a transverse multiplying lever linked to an indicator.

In the same way, shaft 46 has at its ends sprockets 62 driving sprocket chains 64 which in turn drive sprockets 66 on shafts 68 mounted in anti-friction bearings 70 and carrying the rollers 22. Idler sprockets 72, on arms or levers 74 pivoted on the ends of shaft 46, engage the chain and hold it tight. As best shown in Figures 3 and 7, arm 74 has an adjustable thrust part 76 engaging the shorter end of a multiplying lever 78 pivoted at 80 on the carriage, and having its longer end connected by a tension link 82 to an indicator 84, which is illustrated as a suitably-calibrated ordinary spring scale. This part of the mechanism is the same in construction for both front and rear testing devices.

It will be seen that the resistances of the various brakes will cause tension on the chains 50 and 64, which will cause angular movement of sprockets 60 and 72, arms 58 and 74, and levers 78, and which will cause the operation of the four indicators 84 to show the effectiveness of the four brakes.

While one illustrative embodiment has been described in detail, it is not my intention to limit the scope of the invention to that particular embodiment, or otherwise than by the terms of the appended claims.

I claim:

1. A brake testing machine comprising, in combination, means for turning a wheel or the like against the resistance of its brake, a sprocket and chain for operating said means, a source of power for driving said chain, and a direct reading indicator operatively connected to said chain and effected by the tension on said chain to show the resistance of the brake.

2. Brake testing mechanism comprising, in combination, means for turning a wheel against the resistance of its brake, a sprocket operating said means, a power-driven sprocket, a chain connecting said sprockets, and a direct reading indicator operatively connected to the chain and effected by tension on one reach of the chain to show the brake resistance.

3. Brake testing mechanism comprising, in combination, means for turning a wheel against the resistance of its brake, a sprocket operating said means, a power-driven sprocket, a chain connecting said sprockets, an idler sprocket engaging the chain and moved by tension on the chain, a lever rocked by movement of the idler sprocket, and a direct reading indicator operated by the lever.

4. Brake testing mechanism comprising, in combination, means for turning a wheel against the resistance of its brake, a sprocket operating said means, a power-driven sprocket, a chain connecting said sprockets, an idler sprocket engaging the chain and moved by tension on the chain, and a direct reading indicator operatively connected to the idler sprocket and effected by movement of the idler sprocket.

5. Brake testing mechanism comprising, in combination, means for turning a wheel against the resistance of its brake, a sprocket operating said means, a power-driven sprocket, a chain connecting said sprockets, an idler sprocket engaging the chain and moved by tension on the chain, and arm supporting the idler sprocket and mounted for pivotal movement about the axis of one of the other sprockets, and a direct reading indicator operatively connected to the idler sprocket.

6. Testing mechanism comprising, in combination, a support for the front wheels of a car, a movable carriage over which the front wheels are driven onto said support and which is shifted by the front wheels through the driving force of the rear wheels to a position a predetermined distance from said support equal to the wheel base of a small car, and means secured to said carriage and frictionally engaged by the driving wheels of a longer car to draw said carriage rearwardly under said driving wheels.

7. Testing mechanism comprising, in combination, a support for the front wheels of a car, a movable carriage adapted to be positioned a distance from said support equal to the wheel base of a small car, and means secured to said carriage and frictionally engaged by the driving wheels of a longer car to draw said carriage rearwardly under said driving wheels.

8. Testing mechanism including a movable carriage including a pair of wheel-supporting rotatable devices, and front and rear tracks alined with each of said devices and mounted to move with the carriage, together with a drive member for each device also mounted on the carriage and an indicator operatively connected to each of the drive members and effected by the force exerted by each of said members in driving the corresponding device.

9. Testing mechanism comprising, in combination, a support for the front wheels of a car, a carriage arranged to support the rear wheels of the car, and means on said carriage adapted to be frictionally engaged by said rear wheels whereby said carriage is automatically shifted due to the driving force of the rear wheels to an operative position under said rear wheels so as to accommodate the wheel base of the car.

10. Testing mechanism comprising, in combination, rotating means forming a support for the front wheels of a car, a carriage having rotatable means arranged to support the rear wheels of a car, and means on said carriage adapted to be engaged by said rear wheels and operated through the driving force thereof to automatically shift said carriage to an operative position under said rear wheels.

OTTO DARREL DU BOIS.